United States Patent
Aranzulla et al.

(10) Patent No.: US 10,029,645 B2
(45) Date of Patent: Jul. 24, 2018

(54) AIRBAG AND METHOD FOR OPERATING A VEHICLE OCCUPANT PROTECTION SYSTEM

(71) Applicant: TRW AUTOMOTIVE GMBH, Alfdorf (DE)

(72) Inventors: Daniele Aranzulla, Mutlangen (DE); Martin Burkhardtsmaier, Schwäbisch Gmünd (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 15/113,846

(22) PCT Filed: Jan. 28, 2015

(86) PCT No.: PCT/EP2015/000153
§ 371 (c)(1),
(2) Date: Jul. 25, 2016

(87) PCT Pub. No.: WO2015/113756
PCT Pub. Date: Aug. 6, 2015

(65) Prior Publication Data
US 2017/0106829 A1     Apr. 20, 2017

(30) Foreign Application Priority Data
Jan. 30, 2014 (DE) .................. 10 2014 001 084

(51) Int. Cl.
*B60R 21/239* (2006.01)
*B60R 21/237* (2006.01)
*B60R 21/2338* (2011.01)
*B60R 21/276* (2006.01)

(52) U.S. Cl.
CPC .......... *B60R 21/239* (2013.01); *B60R 21/237* (2013.01); *B60R 21/2338* (2013.01); *B60R 21/276* (2013.01); *B60R 2021/2395* (2013.01); *B60R 2021/23382* (2013.01); *B60R 2021/23384* (2013.01); *B60R 2021/2765* (2013.01)

(58) Field of Classification Search
CPC . B60R 21/239; B60R 21/237; B60R 21/2338; B60R 2021/2395; B60R 2021/23382; B60R 2021/23384
USPC ............................................. 280/742, 743.2
See application file for complete search history.

(56) References Cited

U.S. PATENT DOCUMENTS

2011/0031723 A1* 2/2011 Fischer ................ B60R 21/233
280/730.1

FOREIGN PATENT DOCUMENTS

| DE | 102007058666 | 6/2009 |
| EP | 1418093 | 5/2004 |
| EP | 2046040 | 4/2009 |

* cited by examiner

*Primary Examiner* — Keith J Frisby
(74) *Attorney, Agent, or Firm* — Tarolli, Sundheim, Covell & Tummino LLP

(57) ABSTRACT

In an airbag comprising at least one aperture (14) which is provided in an airbag shell (12) and to which a closure element (16) is attached a tether (34) via which the closure element (16) can be maintained in a closed position acts on the closure element (16). The invention moreover relates to a method of operating a vehicle occupant protection system.

17 Claims, 18 Drawing Sheets

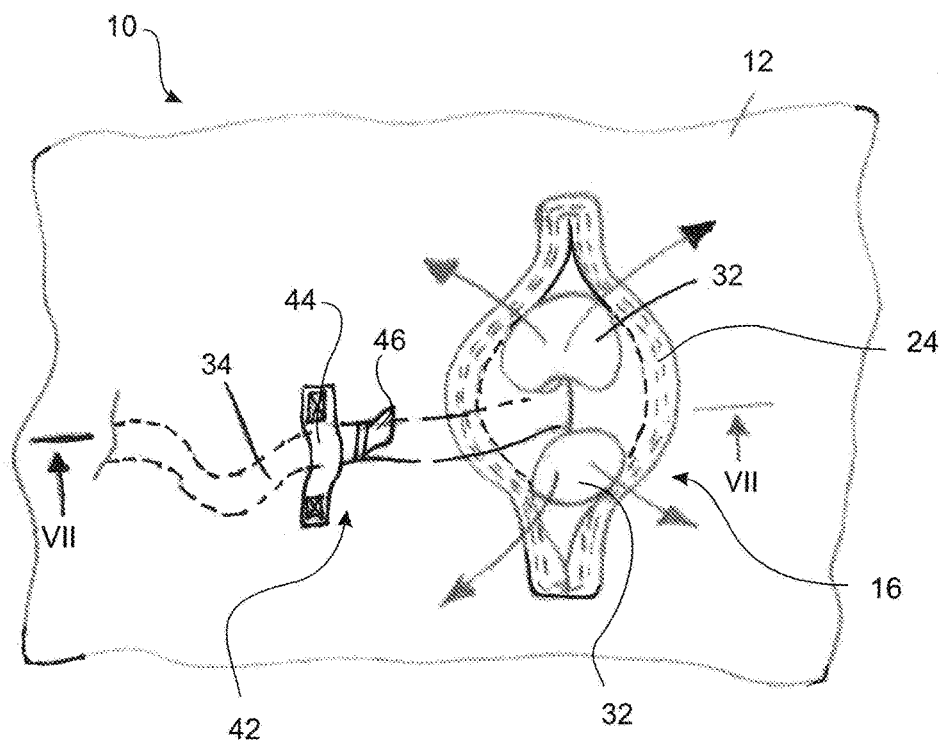
Fig. 6
Fig. 7
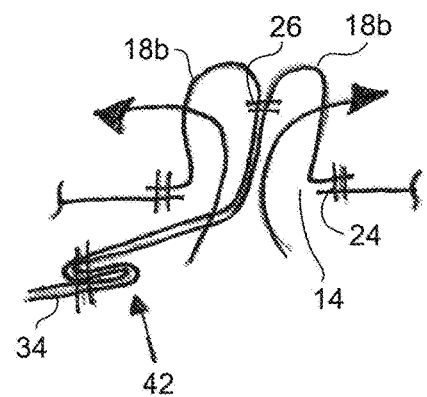

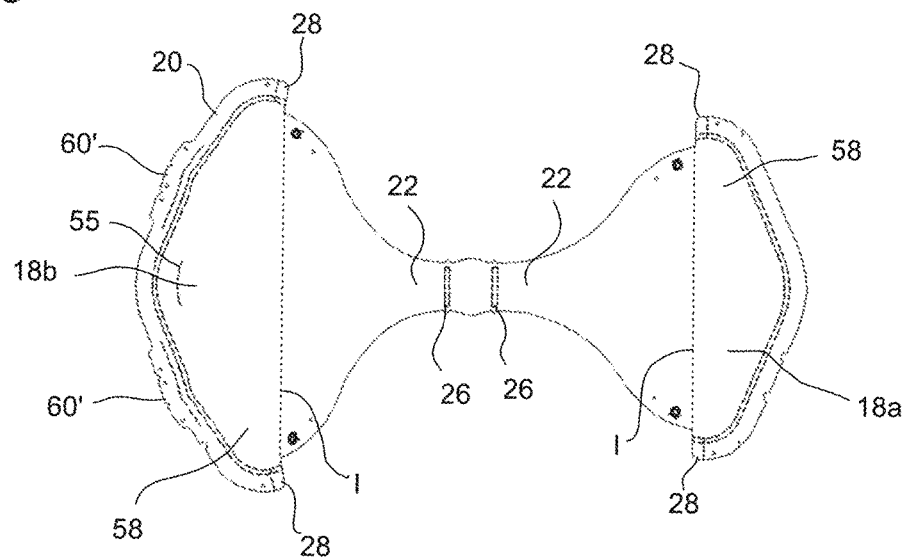
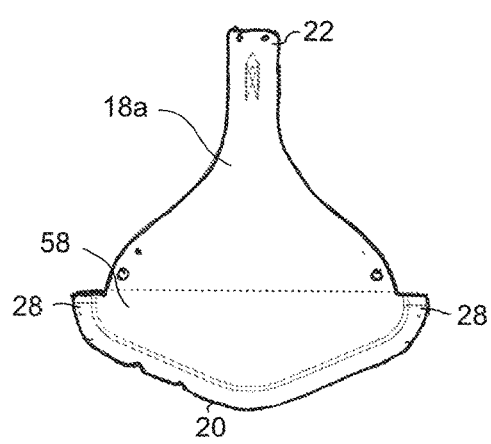
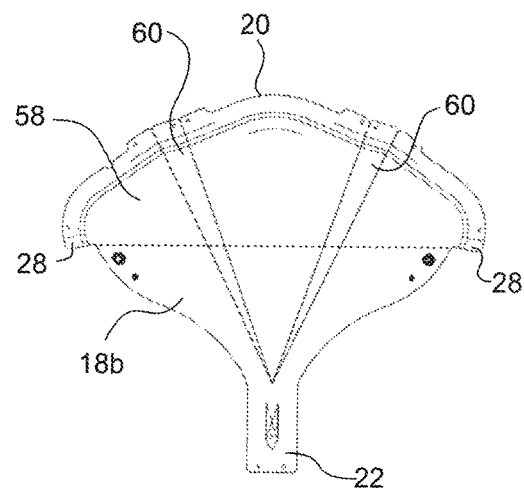

Fig. 37
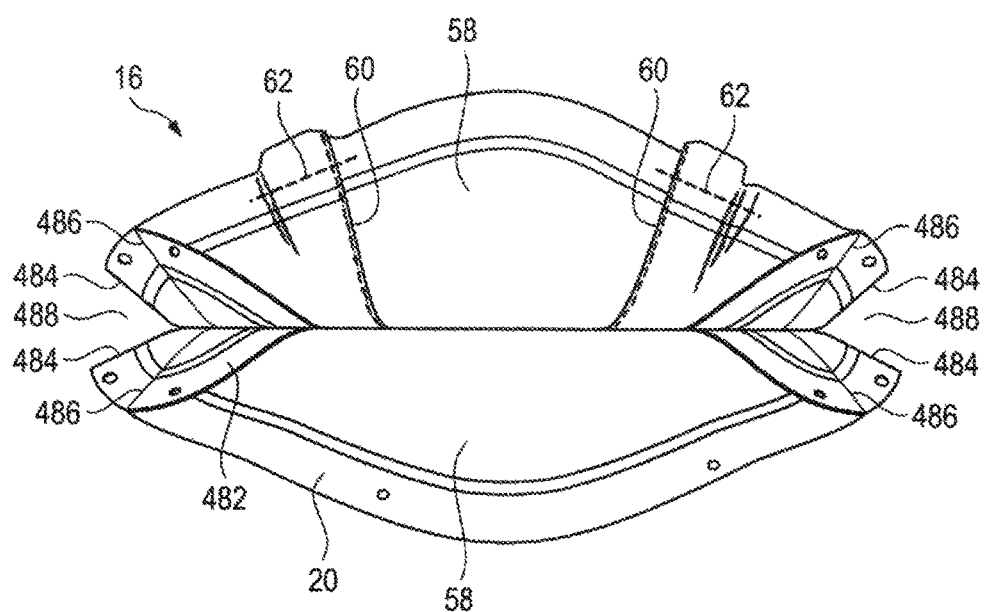
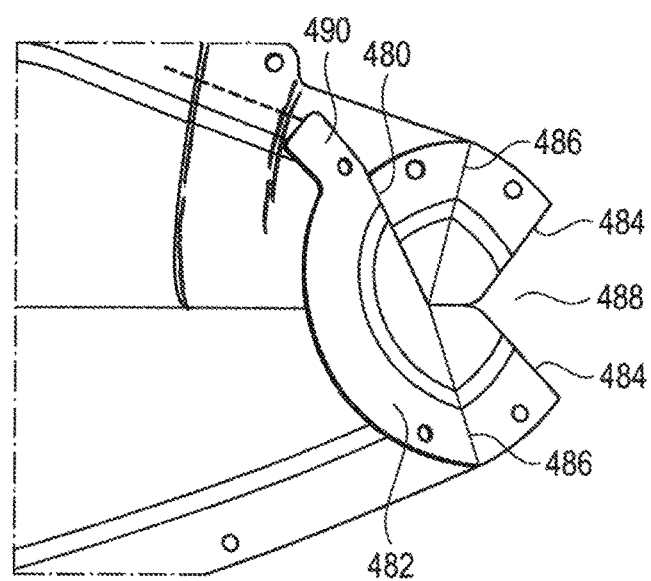
Fig. 38

AIRBAG AND METHOD FOR OPERATING A VEHICLE OCCUPANT PROTECTION SYSTEM

RELATED APPLICATIONS

This application corresponds to PCT/EP2015/000153, filed Jan. 28, 2015, which claims the benefit of German Application No. 10 2014 001 084.8, filed Jan. 30, 2014, the subject matter of which are incorporated herein by reference in their entirety.

BACKGROUND OF THE INVENTION

The Invention relates to an airbag having at least one aperture provided in an airbag shell to which a closure element is attached. Moreover, the invention relates to a method of operating a vehicle occupant protection system.

Such airbag is described, for example, in DE 10 2007 058 656 A1, where a closure element including discharge orifices is attached to the aperture in the airbag shell so that it forms an extension of the airbag wall adapted to be inwardly and outwardly everted. The closure element is connected to a tether and by the latter can be pulled into the interior of the airbag so as to close the discharge orifices. For opening the discharge orifices the closure element is forced outwardly by the gas pressure.

EP 1 418 093 B1, too, illustrates an airbag having a closure element to be everted out of the airbag, the closure element in this case being a narrow hose having an end-side discharge orifice. As a standard, the hose end is drawn into the interior of the airbag shell and is connected to a release device via a tether. Prior to actuating the release device the closure element is forced against the inner wall of the airbag shell by the internal pressure within the airbag and the discharge orifice is closed. After actuating the release device the closure element is everted out of the airbag shell due to the internal pressure of the airbag and the gas may escape through the discharge orifice. It is a drawback, inter alia, that only a small amount of gas may pass the long narrow hose, which impedes rapid ventilation.

The present invention suggests improvements to the afore-described concept of ventilating an airbag.

SUMMARY OF THE INVENTION

It is an object of the invention, on the one hand, to provide a controllable closure element by which rapid ventilation of the airbag is possible, if requested.

In accordance with the invention, this is achieved by an airbag having at least one aperture provided in an airbag shell in which a closure element is attached to the aperture, wherein a tether by which the closure element can be maintained in the closed position acts on the closure element. As long as the closure element is provided in the closed position, substantially no gas can escape from the airbag through the aperture. Gas will escape only when the closure element adopts an opened position. The amount of gas flow can be influenced in this way by the cross-sectional area of the aperture in the airbag shell.

In a preferred embodiment, the deployment of the airbag causes a tension onto the tether to be built up for maintaining the closure element inside the airbag in the closed position or pulling it to the interior of the airbag into the closed position and causing the closure element to close the aperture at least largely by a sealing fold.

The aperture in the airbag shell therefore may be chosen to be relatively large as it is possible to keep it sufficiently tightly closed by the inwardly pulled closure element maintained tensioned by the tether even in the fully inflated airbag upon immersion of a vehicle occupant.

In a preferred embodiment, the tether is fixed to a release device which releases the tether depending on the situation, thus causing the closure element to reach an opened position.

An optimum application of force onto the closure element can be achieved, for example, by the fact that on the inside of the airbag shell at least two deflections for the tether are provided between the release device and the closure element, especially when the release device is arranged in the vicinity of the inflator. In this way, in all states of deployment of the airbag tensile forces can be transmitted to the closure element. Likewise, it can be ensured in this way that the tether loosens upon actuation of the release device so that the tension on the closure element is dropped.

The release device preferably is an actively controlled device coupled to a control unit which causes loosening of the tether as a function of parameters relating to the occupant and/or the vehicle. The parameters may relate, for example, to a current position of the vehicle occupant, to the fact whether a child safety seat is placed on the seat in front of the airbag, to the weight of the vehicle occupant, to the position of the seat, to the size of the vehicle occupant, to the time from release of the airbag system or else to the accident severity.

The moment of releasing the tether and thus of moving the closure element into the opened position and the point in time from which gas escapes from the airbag are exactly determined by the time of activation of the release device and are freely selectable.

The release means comprises e.g. a pyrotechnical trigger unit which may be formed especially by an explosive stud. Preferably, the release means is arranged in the area of the inflator which supplies filling gas to the airbag, wherein a control unit activating the inflator may also be used to activate the release device.

From the closed position the closure element may preferably move to the opened position (or vice versa) substantially perpendicularly to the area of the airbag shell surrounding the aperture.

The closure element in the outwardly everted opened position, especially when the airbag is inflated, preferably has a tapered hollow shape, especially a cone shape, cap shape or funnel shape, so that the closure element puts as little resistance as possible to the gas escaping from the interior of the airbag through the aperture.

It is preferred that the closure element includes at least one, preferably two, lateral discharge orifices so that rapid flow of a large amount of gas can be reached and the airbag can be ventilated within short time.

In a possible embodiment, in an initial deployment phase of the airbag the closure element is located in its closed position inside the airbag shell.

When the release device is actuated, the closure element may be everted out of the airbag into the opened position due to the internal airbag pressure, when the tether is detached from its attachment, wherein especially the discharge orifice opens.

This arrangement allows filling the airbag including the closure element very quickly in the closed position and possibly admitting escape of gas through the aperture specifically at the time of immersion of the vehicle occupant into the airbag or upon hitting an obstacle so as to enable soft absorption.

When sensors detect a situation in which the airbag shall be softer from the beginning, for example the presence of a child safety seat or a vehicle occupant seated in an unfavorable position, the release device may be activated directly by igniting the inflator already at the beginning of inflating the airbag so that from the beginning gas may escape and the airbag is filling more slowly and/or not with the usual hardness.

In another embodiment in an initial deployment phase of the airbag the closure element is provided in its opened position at least partly outside the airbag shell and the discharge orifice is open right from the beginning. In this case, due to the tension on the tether increasing during inflation, the closure element is gradually drawn into the interior of the airbag shell until it preferably contacts the inner side of the airbag shell in a folded state.

It is possible to adjust the length of the tether and the geometry of the airbag such that the aperture is not closed before the airbag is completely deployed. When the airbag impacts an obstacle during deployment, for example an unfavorably seated vehicle occupant or a child safety seat, the aperture remains opened and part of the gas escapes. If the airbag deploys as scheduled, however, without impinging on an obstacle, the closure element is pulled into the closed position by the tether and the aperture is closed. The airbag deploys up to its maximum volume and reaches its maximum internal pressure so that a vehicle occupant can be optimally absorbed.

In order to prevent the aperture from inadvertently opening again due to the pressure increase within the airbag when an occupant immerses, a locking structure may be provided on the tether which prevents a return movement of the closure element from a predetermined state of deployment of the airbag.

It is another object of the invention to provide an airbag that can be compactly packed and to maintain the discharge orifice as lightly closed as possible in the closed state.

According to the invention, this is achieved with an airbag having at least one aperture provided in an airbag shell to which a closure element having at least one discharge orifice is attached, wherein a peripheral edge of the closure element is fastened peripherally about the edge of the aperture so that the edge of the aperture forms a circumferential diaphragm protruding radially inwardly from the peripheral edge of the closure element.

The airbag may be formed as afore described, for example, and may also be used as afore described.

The peripheral edge of the closure element is fastened preferably circumferentially without interruption and at a radial distance from the edge of the aperture. In this way the edge of the aperture forms a diaphragm between the closure element and the interior of the airbag up to the peripheral seam by which the closure element is fastened to the airbag shell. This diaphragm supports the fabric layers of the closure element and laterally seals the closure element in the closed state in which the closure element is located inside the airbag.

The diaphragm preferably remains at least largely movable relative to the closure element so that the closure element cannot excessively distort the edge of the closure element even in the case of high gas pressure. Therefore the entire cross-section of the aperture is always available for gas escaping from the airbag into the closure element.

When using equal closure elements, the gas escape may be easily adapted by varying the area of the discharge orifice.

It is also possible, of course, to provide a separate annular fabric piece around the edge of the aperture as a diaphragm, wherein the aperture then is defined by the fabric piece.

The cross-sectional area of the aperture preferably takes approximately a diamond shape as it has turned out that in this way a flat folding of the airbag can be achieved.

The peripheral edge of the closure element preferably is not located in a plane but is shaped so that is takes approximately the same shape as the aperture in the airbag shell, when the closure element is fastened to the airbag shell. This shape reduces and, respectively, prevents constrictions at the diaphragm.

It is another object of the invention to design the closure element such that it adopts a stable shape in the opened position and at the same time can be easily housed in the airbag in a space-saving folded manner.

In accordance with the invention, this is achieved with an airbag having at least one aperture provided in an airbag shell to which a closure element having at least one discharge orifice is attached, wherein the closure element includes at least two overlying cut portions interconnected along a peripheral edge, and wherein at least one of the cut portions includes one or more stitched-down folds or quillings and/or is composed of plural cut portions having at least one curved seam so that the cut portion cannot be flatly spread.

It is possible to form both cut portions in this way. However, it has turned out that sufficient stability is reached already when the second cut portion is formed of a one-piece fabric portion adapted to be flatly spread.

The shape of the one cut portion which is not flat but pre-shaped to be arched provides a reduced opening time of the discharge orifice, i.e. a reduction of the time required by the closure element to evert out of the airbag shell from the closed position into its opened position and causes stabilization of the shape of the closure element in the opened position.

In this case, too, the airbag may of course exhibit the further features already discussed in the foregoing and can be used just as the already described airbags.

An especially suited shape for the closure element is resulting when each of the cut portions has a subarea extending from the peripheral edge into the surface of the cut portion, wherein, when the discharge orifice is closed, the two subareas complement each other into one surface corresponding in its shape to the cross-sectional area of the aperture in the airbag shell.

It is favorable to select a shape that permits folding the closure element in total so that a closed flat surface is resulting from subareas of the two cut portions, the shape of the surface corresponding to the aperture in the airbag shell but being somewhat larger so that it can be sewn onto the airbag shell above the aperture. In this way tensile forces acting on the edge of the aperture which might deform the aperture are prevented. This ensures that in all deployment stages of the airbag the flow of gas from the interior of the airbag shell into the closure element is constant. Darts or quillings possibly located in this subarea should be configured so that they fit into the flat surface. This applies mutatis mutandis to the use of curved seams which should be configured such that in the subarea a surface adapted to be flatly spread is formed.

The closure element may be formed, for example, of two overlying cut portions each being approximately club-shaped or bell-shaped. A tether is attached to an elongate end of each of the cut portions, while the respective cut portion is fastened on the airbag shell at the peripheral edge opposite to the elongate end. The cut portions are interconnected at the elongate end as well as at a respective portion in the area of the peripheral edge, preferably by stitching, wherein the cut portions are not connected over a major part of the side edges located between the elongate end and the peripheral edge so that two lateral discharge orifices are formed in the closure element. The cut portions are connected preferably at a point where the side edges meet the peripheral edge of the respective cut portion so that the peripheral edge forms a closed ring.

The cut portions may also be connected at the peripheral edge by a peripheral seam which is produced as late as upon fastening the closure element to the edge of the aperture within the airbag so that the cut portions are not tightly interconnected in the area of the peripheral edge before.

It is substantially sufficient when the two cut portions are connected at three points, i.e. at the elongate end as well as at the two most laterally exterior areas of their peripheral edge. In this way, substantially the entire side edges between the peripheral edge and the elongate edge may serve as discharge orifice, thus permitting high gas flow. Moreover, the number of the seams and the length of the seams are minimized in total.

At the points where the peripheral edge portions of the two cut portions are adjacent preferably excess material is provided which allows overlapping of the peripheral edge portions.

The overlapping may be substantially formed by a short projection of the peripheral edges.

It is also possible, however, to provide at each free end of the peripheral edge portion in the area of the later narrow sides of the closure element a projecting fabric lug which may be folded in such way that a continuous circumferential peripheral edge is resulting.

For this purpose, the closure element may include two cut portions each comprising a peripheral edge portion, wherein a fabric lug which is partly separated from the respective cut portion by a notch is formed on each free end of the peripheral edge portions.

For example, the fabric lugs are folded down along two juxtaposed radial folding lines vis-à-vis the surface of the respective cut portion so that a peripheral edge that is circumferential in a plane is formed.

The notch in the surface of the cut portion permits folding down the respective fabric lug vis-à-vis the surface of the cut portion. A stable peripheral edge circumferential in a plane at which the closure element can be fastened on the airbag e.g. also by an automated sewing process can thus be formed out of a compact cut shape by simple folding operations by folding along two juxtaposed radially aligned folding lines.

For automating the sewing process, sensor tabs radially projecting from the peripheral edge which enable automated positional detection and thus permit e.g. a CNC sewing operation are preferably provided at the peripheral edge, especially in the area of the fabric lugs.

It is possible to use two separate cut portions. The two cut portions may also be integrally interconnected at the elongate ends thereof, however.

For fastening the tether preferably a loop on which the tether acts is provided at the closure element. For this, for example the two cut portions may be sewn up to form a fabric loop through which a cord is pulled. This is obvious mainly when the two cut portions are integrally formed.

The term "tether" is not restricted to flat ribbons but comprises all flexible elongate bodies that transmit tension.

It is also possible to sew each cord or fabric loop to the elongate end of either both cut portions or one cut portion so that a loop is resulting.

The advantage of the use of an additional loop as compared to the fixed stitching of the tether directly onto the closure element resides in the fact that better force distribution may be brought about when the tether may align itself vis-à-vis the closure element.

Furthermore, the invention also achieves the object to offer improved vehicle occupant protection.

This is achieved by a method according to the invention for operating a vehicle occupant protection system, with said vehicle occupant protection system including an airbag as afore described. The control unit coupled to the release device may prompt the release of the tether already at the beginning of the deployment operation, when a sensor system connected to the control unit recognizes predetermined parameters relating to the occupant and/or the vehicle. In this context, especially parameters from which an obstacle in the deployment path of the airbag can be concluded are relevant.

This object is also achieved by a method of operating a vehicle occupant protection system that may be equipped with an afore-described airbag, wherein in an initial deployment state of the airbag the closure element is in its opened position and with increasing deployment of the airbag the closure element is pulled into the interior of the airbag shell into the closed position. Via fixation of the tether sufficient tension is exerted on the closure element from a predetermined deployment state of the airbag so as to maintain the closure element in the closed state. The release device may loosen the tether depending on predetermined parameters relating to occupants and/or the vehicle so that the closure element is moved by the internal pressure of the airbag into the opened position again. In this case, basically gas escapes through the aperture, when the airbag hits an obstacle even without the release device being triggered. If the airbag deploys as scheduled, however, the gas discharge is stopped in the course of deployment. If, however, the airbag shall have a hardness lower than the maximum hardness upon impact of an occupant, for example because sensors have detected a particular position or a particular weight of the vehicle occupant, the release device is activated at the appropriate point in time and the tether is loosened so that gas is discharged again.

All described features of the individual embodiments can be exchanged for each other or combined with each other at the discretion of those skilled in the art.

BRIEF DESCRIPTION OF THE DRAWINGS

Hereinafter the invention shall be described in detail by way of plural embodiments with reference to the enclosed drawings, in which:

FIG. 6 shows an airbag according to the invention in accordance with a second embodiment in a schematic top view, with the closure element being in the opened position;

FIG. 7 shows a schematic sectional view of the airbag of FIG. 6 along the line VII-VII in FIG. 6;

FIG. 19 shows a possible configuration of a cut of the closure element of FIG. 17 in which two cut portions are integrally connected;

FIGS. 20 and 21 show a possible configuration of the cut portions of a closure element of the airbag of FIG. 17 in which the two cut portions are in the form of separate parts;

FIGS. 37 to 40 illustrate the folding steps shown in FIGS. 33 to 36 in a different representation;

DESCRIPTION

Figure 1:
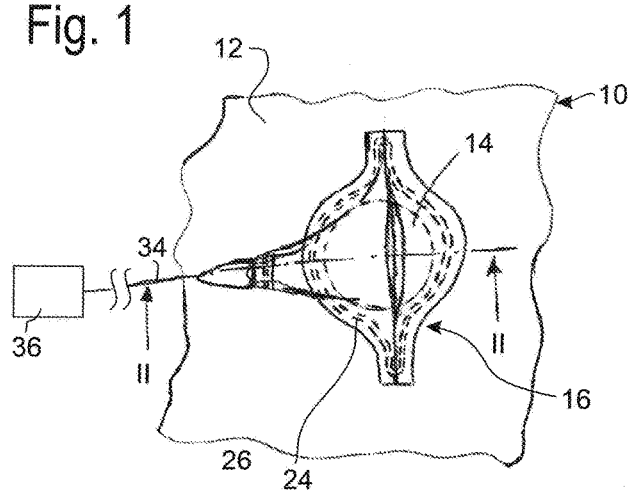
FIG. 1 shows an airbag according to the invention in accordance with a first embodiment in a schematic top view, with the closure element being in the closed position.

For reasons of clarity, in the Figures the same reference numerals are used for all embodiments, unless any parts are definitely different from a previous embodiment. In such case the respective part is provided with a respective numeral increased by 100.

FIGS. 1 to 5 illustrate an airbag 10 according to a first embodiment.

The Figures Illustrate of the airbag 10 only a cutout of an airbag shell 12 which substantially encloses the interior of the airbag 10.

In the airbag shell 12 an aperture 14 is formed which is covered by a separate closure element 16 sewn up with the airbag shell 12. The entire aperture 14 in the airbag shell 12 is covered by the closure element 16 as is evident from FIG. 1.

Instead of sewing, in the entire application also a different suitable type of fastening may be used, for example welding, gluing or weaving in one piece. The term "sewing" or "seams" is used throughout here for reasons of clarity only.

Figure 5:
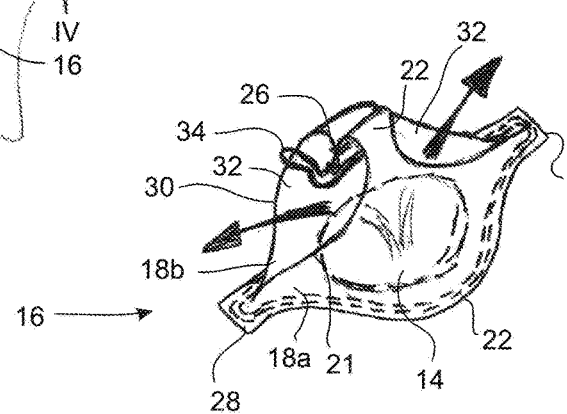
FIG. 5 shows the closure element of the airbag of FIG. 3 in a schematic perspective view.
Figure 8:
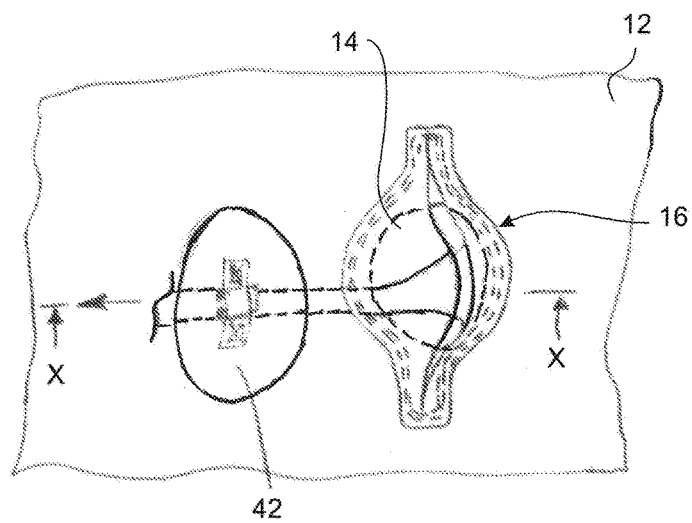
FIG. 8 shows a schematic top view of the airbag of FIG. 6 during closure of the discharge orifice and blocking of the locking element.
Figure 9:
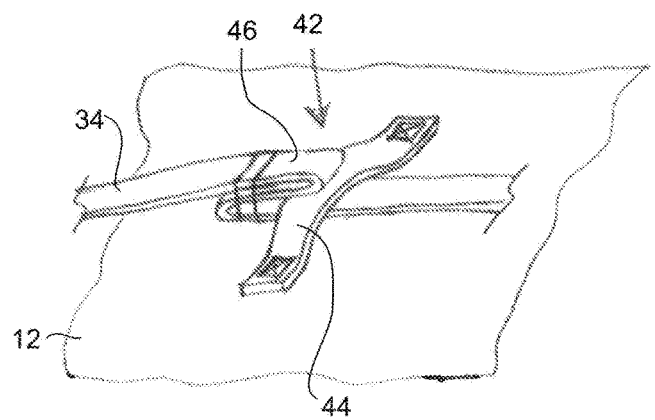
FIG. 9 shows a schematic perspective representation of the blocking of the locking element of the airbag of FIG. 8.
Figure 10:
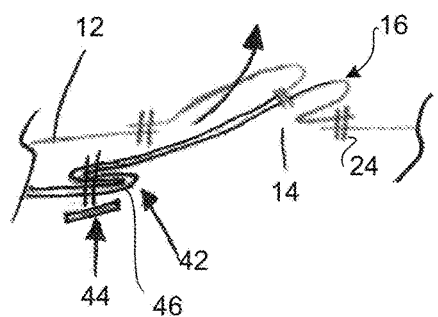
FIG. 10 shows a schematic sectional view of the airbag in FIG. 8 along the line X-X in FIG. 8.
Figure 11:
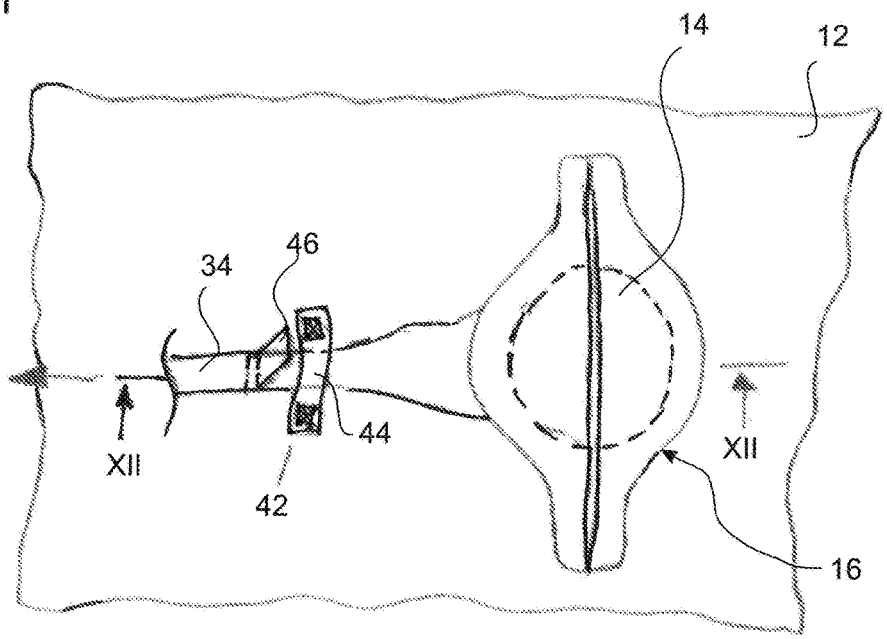
FIG. 11 shows a schematic view of the airbag of FIG. 6 with the discharge orifice being closed and the tether being blocked.
Figure 12:
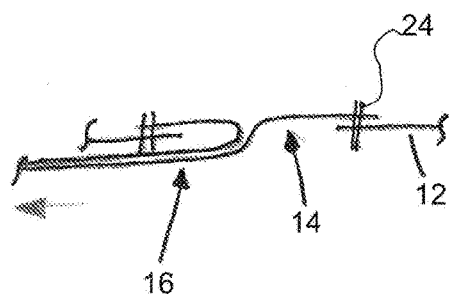
FIG. 12 shows a schematic sectional view of the airbag of FIG. 11 along the line XII-XII in FIG. 11.

The closure element 16 is illustrated in detail in FIG. 5. In this case it is formed of two cut portions 18a, 18b each including a surface area delimited by a peripheral edge 20 and by two side edges 21 as well as an elongate end 22 opposite to the peripheral edge 20. In a top view, the cut portions 18a, 18b are approximately bell-shaped or club-shaped.

The peripheral edge 20 of each of the cut portions 18a, 18b is sewn up with the airbag shell 12 by means of a peripheral seam 24.

At the elongate ends 22 the two cut portions 18a, 18b are connected by means of a seam 26. In this example, the two cut portions 18a, 18b are moreover sewn together at the two most external edge areas 28 (cf. FIG. 5) so that the closure element 16 in total has a circumferential peripheral edge. Apart from said connections, the cut portions 18a, 18b are not fixed to each other so that the closure element 16 is completely open above the aperture 14 in the airbag shell 12. Likewise, the sides 21 between the edge area 28 and the elongate end 22 are open so that two large lateral drop-shaped discharge orifices 32 are formed.

Figure 2:
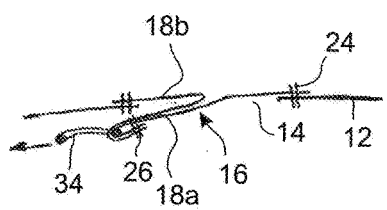
FIG. 2 shows the airbag of FIG. 1 in a schematic sectional view along the line II-II in FIG. 1.

The closure element 16 may take a closed position as shown in FIGS. 1 and 2 in which it is folded into the interior of the airbag shell 12 and the discharge orifices 32 and thus the entire aperture 14 are closed in a substantially gastight manner by the folded closure element 16.

Figure 3:
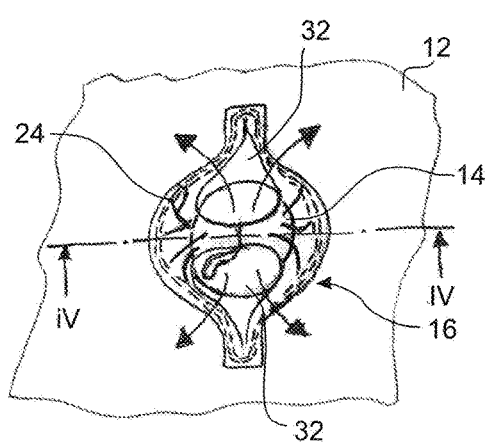
FIG. 3 shows the airbag of FIG. 1 in a schematic top view, with the closure element being in an opened position.
Figure 4:
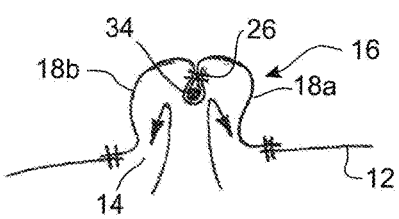
FIG. 4 shows the airbag of FIG. 3 in a schematic sectional view along the line IV-IV in FIG. 3.

In the opened position as illustrated in FIGS. 3 to 5, the closure element is everted out of the airbag shell 12, on the other hand, so that a perpendicularly outwardly projecting bulge is resulting which is substantially perpendicular to the airbag shell 12 in the surrounding of the aperture 14. The closure element 16 in its opened position resembles an outwardly tapered hollow which is cone-shaped, funnel-shaped or cap-shaped, for example.

In order to maintain the closure element 16 in the closed position or bring the same into the closed position a tether 34 which at least initially is tightly fixed in the airbag 10 is attached to the elongate ends 22 of the cut portions 18a, 18b of the closure element 16.

When tension is exerted on the tether 34, the closure element 16 remains within the shell 12 even with an increasing internal pressure of the airbag or is pulled into the shell, if it is in the opened position. The tension exerted on the tether 34 moreover effectuates that the gas pressure does not evert the closure element 16 outwardly but urges the same against the airbag shell 12 from inside and hence closes or keeps the discharge orifice 32 closed.

In the embodiment shown here the tether 34 is connected to a release device 36 which is provided e.g. on the inflator 38 supplying filling gas to the airbag 10 (schematically shown in FIGS. 13 to 16).

The release device 36 is configured such that it can release the tether 34 initially connected thereto so that there is no more tension acting on the tether 34.

In this example, the release device 36 is a pyrotechnical device, for example including an explosive stud, wherein ignition and thus release of the tether is carried out by a control unit 40 (cf. FIG. 13) which in predetermined situations sends a trigger signal to the release device 36.

In a first possible method the closure element 16 is housed in its closed position in the folded airbag 10. The tether 34 is arranged and dimensioned as to its length so that at the beginning of deployment of the airbag 10 sufficient tension acts on the tether 34 so as to maintain the closure element 16 in the closed position inside the airbag shell 12.

During normal deployment of the airbag 10 the closure element 16 throughout remains in the closed position and the discharge orifices 32 remain closed so that through the latter substantially no gas escapes from the airbag 10.

A sensor system (not shown) detects situational parameters, parameters relating to occupants and/or to the vehicle such as, e.g., a seating position, size and weight of the vehicle occupant, a current position of the occupant, the time elapsed since the inflator has been activated or an accident severity. Based on one or more of said parameters the control unit 40 may decide to release the tether 34, whereupon the internal pressure prevailing inside the airbag 10 everts the closure element 16 out of the airbag shell 12 through the aperture 14 and moves it into its opened position so that gas may escape through the discharge orifices 32.

In case that, for example, an unfavorable current position of the vehicle occupant is recognized or it is recognized that a child safety seat is mounted on the vehicle seat, in this example the release device 36 releases the tether 34 directly at the beginning of deployment of the airbag 10 so that part of the filling gas permanently escapes from the airbag 10.

FIGS. 6 to 12 illustrate a second embodiment.

It is provided in this case that the closure element 16 in the folded airbag 10 is in its opened position so that already at the beginning of deployment it is provided in its opened position and the discharge orifices 32 are released.

With a progressive deployment of the airbag 10, due to its expansion the airbag exerts tension on the tether 34 and thus pulls the closure element 16 through the aperture 14 into the closed position thereof in which the discharge orifice 32 is closed. In the completely deployed state the discharge orifice 32 is completely closed in this case.

When the airbag 10 impacts an obstacle during initial deployment, however, the closure element 16 remains in its opened position and the discharge orifices 32 remain opened (cf. also embodiment according to FIGS. 13 to 16).

In order to prevent the discharge orifice 32 from inadvertently opening by the pressure increase inside the airbag 10 upon absorbing the vehicle occupant, a locking structure 42 which retains the closure element 16 in the closed position is provided in this case.

The locking structure 42 is formed of a tab 44 arranged at the inside of the airbag shell 12 and a pertinent stop element 46 at the tether 34. The stop element 46 is simply formed by a stitched-down loop of the tether 34 in this case.

In the direction of tension toward the closed state the stop element 46 slides through the tab 44 without any significantly higher force having to be exerted. However, any return movement will be inhibited as the projecting loop of the stop element 46 gets caught at the tab 44 (cf. FIG. 9).

In this embodiment no release device 36 is provided. It would be possible, however, to fasten the tether 34 also in this case to such release device 36 which in particular situations releases the tether 34 so that the closure element 16 may return to the opened position again. In this event, the locking structure then may be omitted or may be designed such that it is suspended upon triggering of the release device.

Such combination is shown in FIGS. 13 to 16.

Figure 13:
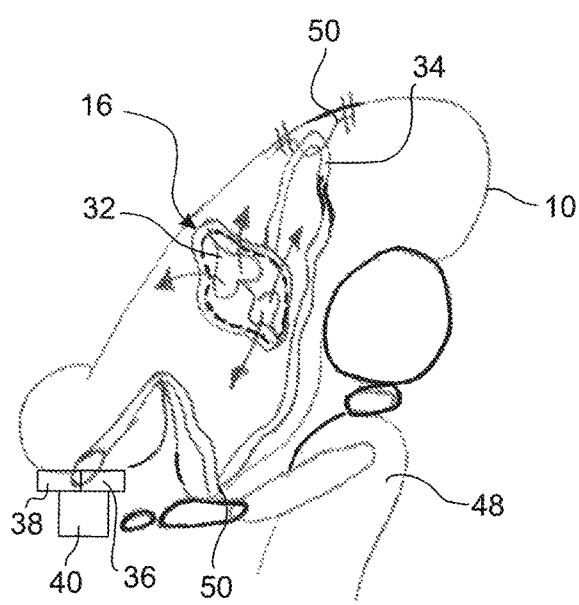
FIG. 13 shows an airbag according to the invention in accordance with a third embodiment in a schematic sectional view with the discharge orifice being opened upon impacting a vehicle occupant.

FIG. 13 illustrates the case in which a vehicle occupant 48 is in an unfavorable position when the airbag 10 deploys.

The closure element 16 in this case is provided in its opened position at the beginning of deployment of the airbag 10 so that the discharge orifices 32 are released and open. When the airbag 10 impacts the vehicle occupant 48, no sufficient tension has been built up yet via the tether 34 in order to move the closure element 16. The closure element 16 therefore remains in its opened position. The gas may escape from the airbag through the discharge orifices 32 and the airbag 10 remains relatively soft.

The tether 34 is deflected at two locations between the fastening points on the release device 36 and the closure element 16 at the upper and lower ends of the airbag 10 in the Figure by deflections 50.

Figure 14:
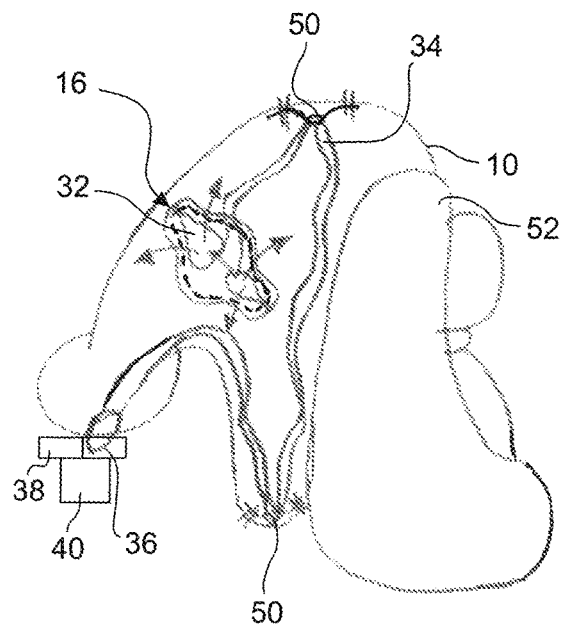
FIG. 14 shows the airbag of FIG. 13 with the discharge orifice being opened upon impacting a child safety seat.

FIG. 14 illustrates the case in which a child safety seat 52 is mounted on the vehicle seat. Analogously to the aforedescribed situation, during its entire period of deployment the airbag 10 remains in a state in which the closure element 16 is in the opened position and gas may escape via the discharge orifices 32.

In both cases the release device 36 does not respond. The tether remains connected to the release device 36 throughout the entire deployment period of the airbag 10.

Figure 15:
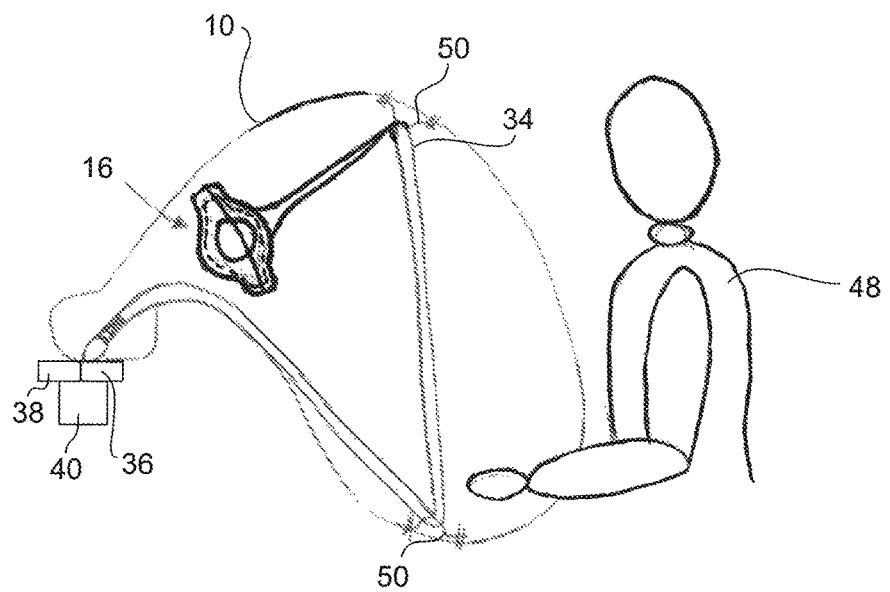
FIG. 15 shows the airbag of FIG. 13 in the fully inflated state with the discharge orifice being closed before immersion of the vehicle occupant.

FIG. 15 illustrates the case in which a vehicle occupant 48 is absorbed by a completely filled airbag 10. The airbag 10 deploys, as provided, into its full size without hitting an obstacle. From a particular deployment state tension starts acting on the tether 34 so that the closure element 16 is pulled into the closed position and the discharge orifices 32 are closed.

Figure 16:
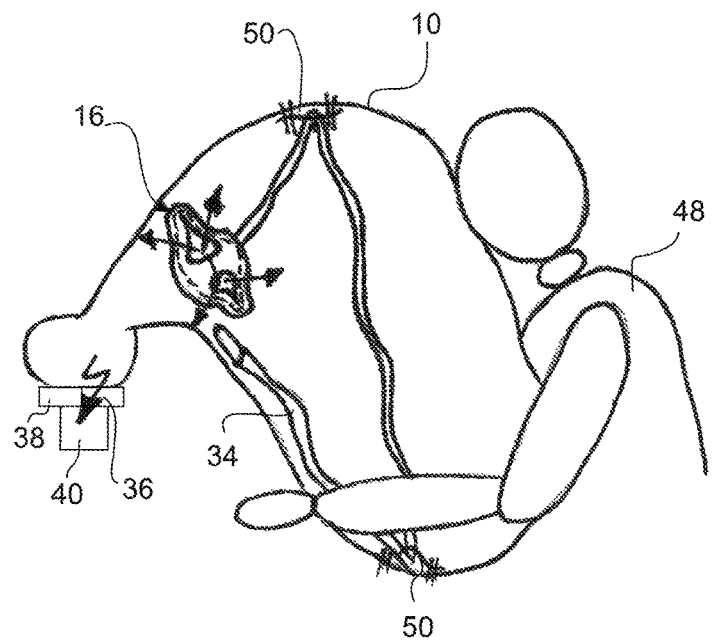
FIG. 16 shows the airbag of FIG. 15 upon immersion of the occupant with the discharge orifice being opened.

FIG. 16 shows the case in which, upon complete deployment and inflation of the airbag 10, the hardness of the airbag 10 is to be reduced, for example in the case of a small, light-weight vehicle occupant 48 seated closely to the airbag. After the airbag 10 has adopted its completely deployed state, the release device 36 is activated and the tether 34 is loosened. By the internal pressure of the airbag, but at the latest when the vehicle occupant 48 immerses into the airbag 10, the closure element 16 is everted out of the airbag shell 12 through the aperture 14 into its opened position and the discharge orifices 32 are opened so that the gas can escape.

FIGS. 17 to 27 illustrate different variants of the closure element 16.

Figure 17:
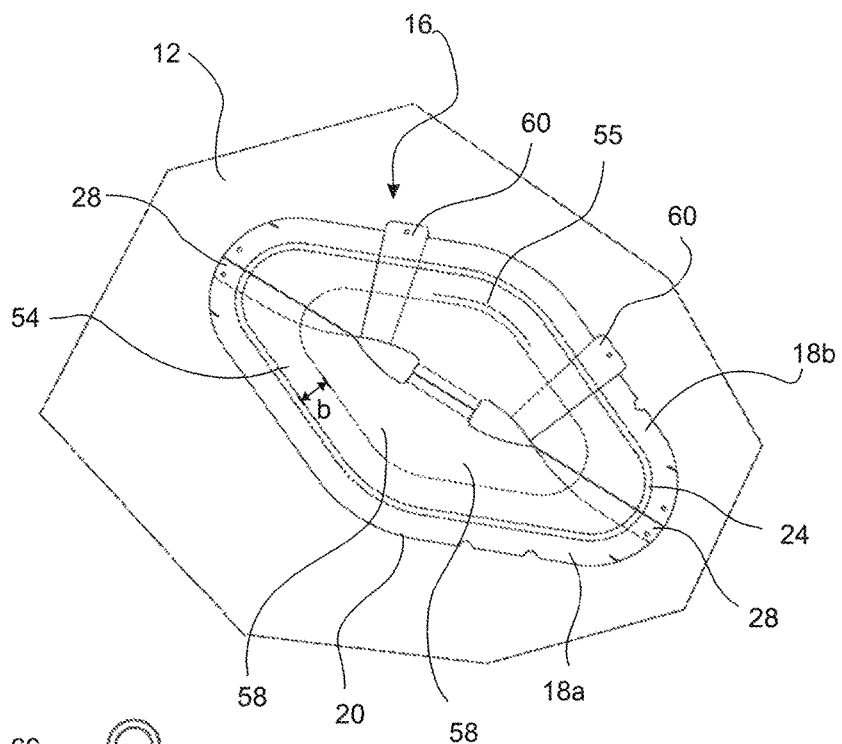
FIG. 17 shows a schematic top view onto a section of an airbag according to the invention from the outside of the airbag shell with a closure element being in the closed position.

FIG. 17 shows the edge of the aperture 14, in the top view covered by the overlying closure element 16.

In the embodiments shown here the aperture 14 in the airbag shell 12 is diamond-shaped having rounded corners.

The peripheral edge 20 of the closure element 16 takes substantially the same shape but is somewhat larger.

The peripheral seam 24 connecting the peripheral edge 20 of the closure element 16 to the airbag shell 12 is configured to have a radial distance b from the inner edge of the aperture 14. In this way, between the peripheral seam 24 and the edge of the aperture 14 a diaphragm 54 is formed which is substantially movable relative to the closure element 16 and projects inwardly from the peripheral seam 24. One or more sacrificial seams 55 may be provided in addition to the peripheral seam 24.

The diaphragm 54 which always extends approximately along an extension of the airbag shell 12 inter alia has the function of providing a sealing in the closed state of the closure element 16.

Moreover, by the diaphragm 54 a direct application of force onto the edge of the aperture 14 is avoided, which is why the aperture 14 retains a substantially constant cross-section and thus there is always a reproducible gas escape from the interior of the airbag into the closure element 16.

The diamond shape of the aperture 14 and the peripheral seam 24 enables the fabric layers of the airbag 10 to be flatly packed.

Figure 18:
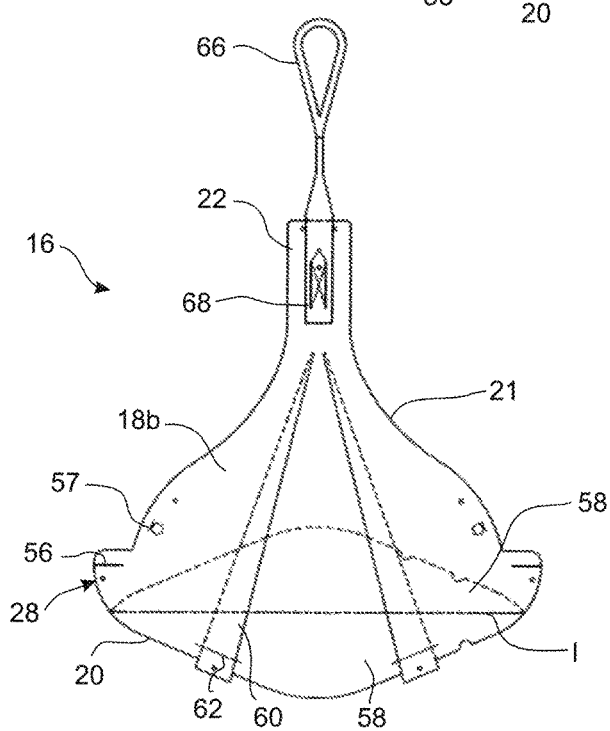
FIG. 18 shows a schematic view of a closure element for the airbag of FIG. 17.

FIG. 18 solely illustrates the closure element 16 shown in FIG. 17.

The elongate ends 22 of the two cut portions 18a, 18b are sewn up together (cf. also FIG. 5). Furthermore, the two cut portions 18a, 18b are fastened to each other at the outer areas 28 by means of a respective cross-seam 56 and a head seam 57. In this example no further fixations and connections are provided. The peripheral edges 20 might also be fixed as late as upon fastening the closure element 16 to the shell 12 of the airbag 10 by the peripheral seam 24 without providing a separate connection of the cut portions 18a, 18b to the peripheral edge 20.

The peripheral edge 20 of each of the cut portions 18a, 18b encloses, together with an imaginary line I (cf. also FIGS. 19 to 21), a subarea 58, wherein the two subareas 58 when being adjacent form a surface which corresponds as to its shape to the aperture 14 but is so large that it can completely cover the aperture 14. This allows forming a closed surface above the aperture 14 by means of the two subareas 58, when the closure element 16 is in its closed position (cf. FIG. 18).

FIG. 19 illustrates a cut for the closure element 16 in which the two cut portions 18a, 18b are integrally connected at their elongate ends 22. The peripheral edge of the cut portion 18a located on the outer right side in FIG. 18 already exhibits the contour of the peripheral seam 24 corresponding as to its shape to the edge of the aperture 14.

In this example the surface area of the cut portion 18b is larger than that of the cut portion 18a, as there additional fabric 60' is provided for two folds 60 in this example. The folds 60 are folded starting from the elongate end 22 of the cut portion 18b and are permanently fixed to the peripheral edge 20 by means of a cross-seam 62. In this manner, a curved shape that cannot be completely flatly spread is imparted to the cut portion 18b. The folds 60 provide for pre-curvature and stabilization for the closure element 16 in the opened position.

In the subarea 58 the folds 60 are formed so that the subarea 58 including the folds 60 can be flatly spread.

FIGS. 20 and 21 show a similar embodiment in which merely the two cut portions 18a, 19b are cut out separately from each other and are not integrally connected.

Figure 22:
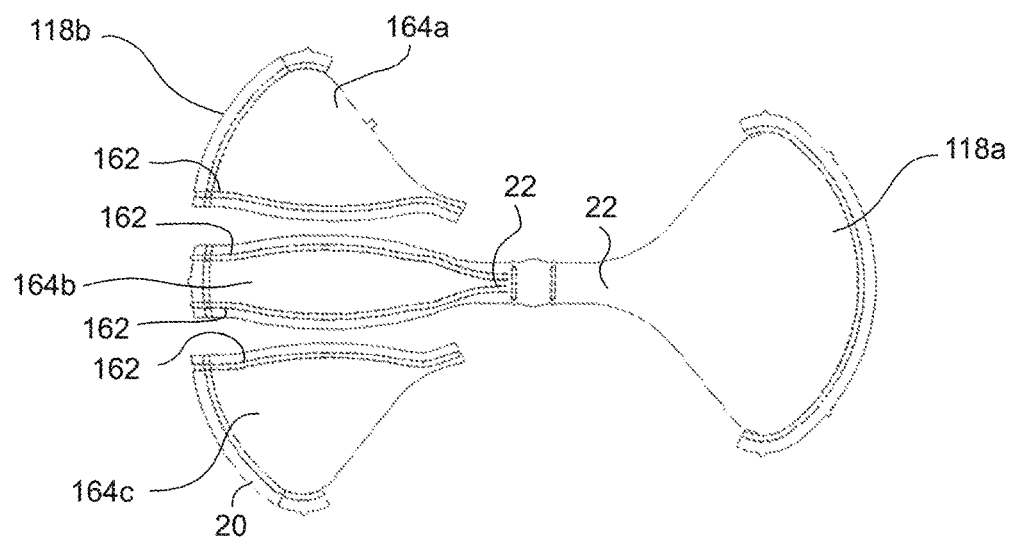
FIG. 22 shows another configuration of the cut of a closure element of an airbag of FIG. 17 in which one of the cut portions is composed of three parts being connected by respective curved seams.

FIG. 22 illustrates an embodiment in which the cut portion 118b is made of a total of three cut parts 164a, 164b and 164c. Instead of the folds 60, in this case curved seams 162 are used to produce the curved three-dimensional shape of the cut portion 118b which cannot be flatly spread. In this example, all connecting seams are in the form of curved seams, but it would also be possible to design some of the seams to be straight depending on the desired shape.

In this case the central cut part 164b is connected integrally to the cut portion 118a formed as in FIG. 19. The residual cut parts 164a and 164c are sewn up laterally with the central part 164b.

Figure 23:
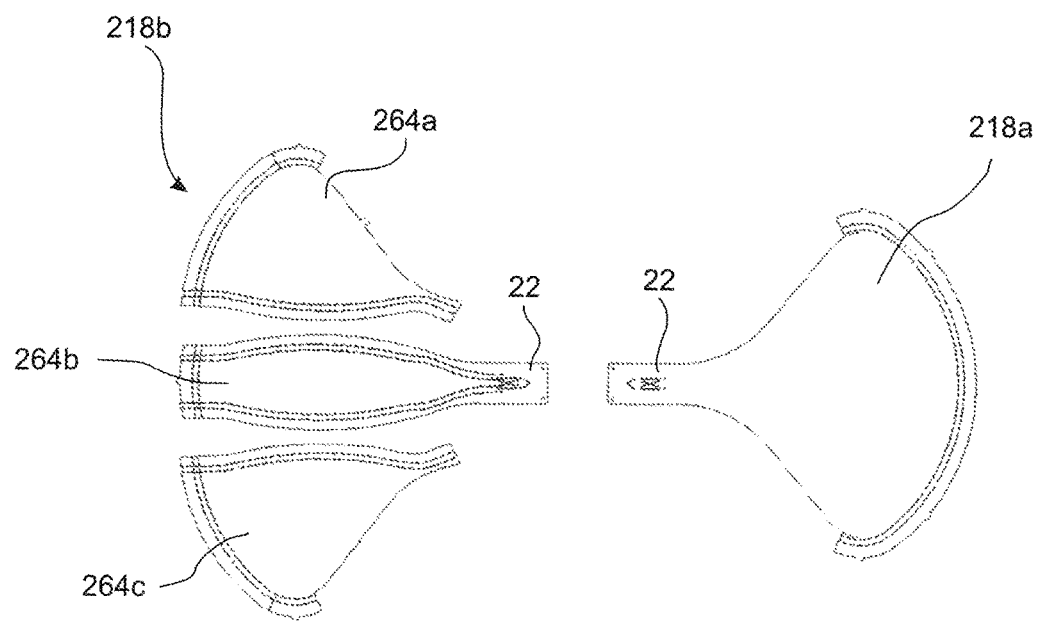
FIG. 23 shows another configuration of a cut of a closure element of the airbag of FIG. 17 in which one of the cut portions is composed of three parts being connected by respective curved seams, wherein the two cut portions constitute separate parts.

A variant in which all three cut parts 264a, 264b, 264c are configured as separate parts is shown in FIG. 23.

Figure 24:
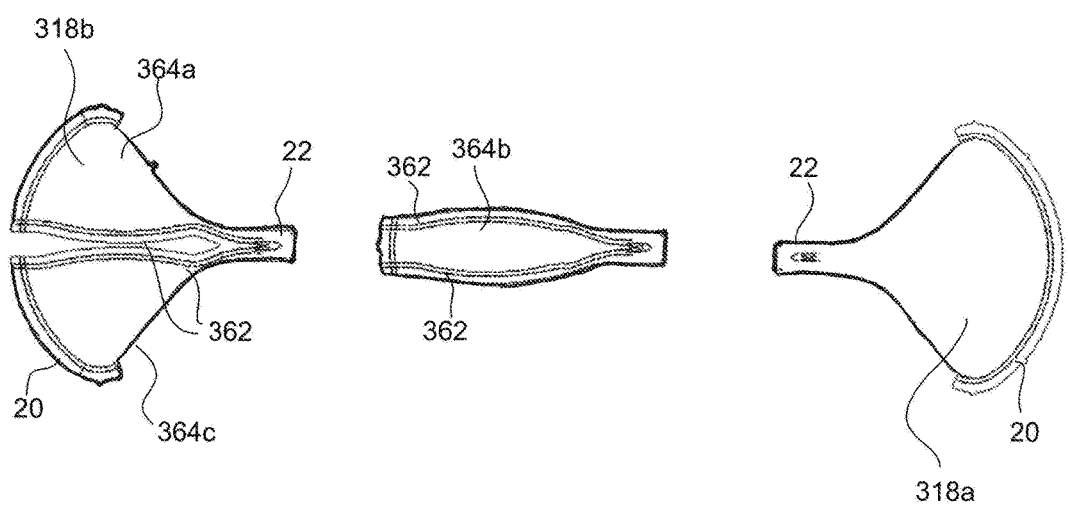
FIG. 24 shows another configuration of a cut of a closure element of the airbag of FIG. 17 in which one of the cut portions is composed of two parts connected by curved seams.

FIG. 24 illustrates a similar configuration in which the cut parts 364a and 364c are integrally formed, whereas the central cut part 364b is a separate part. Here also the portion 318a corresponding to the cut portion 18a is in the form of a separate cut part.

Figure 26:
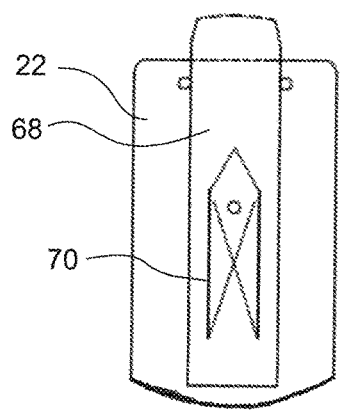
FIG. 26 shows the detail XXVI of FIG. 25.
Figure 25:
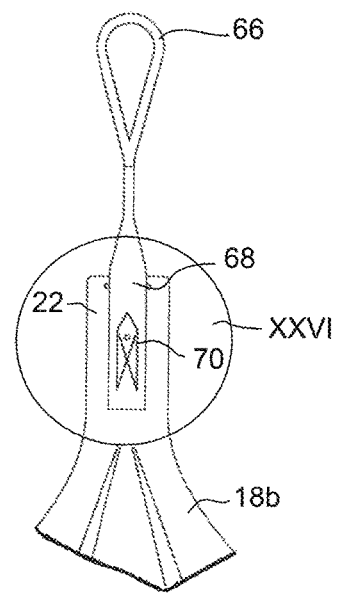
FIG. 25 shows a schematic representation of the fastening of the tether to the closure element in which the tether is sewed up with both cut portions.
Figure 27:
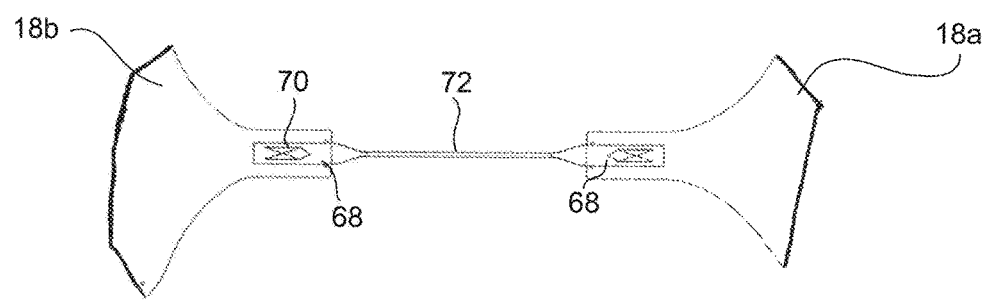
FIG. 27 shows a schematic representation of the fastening of the tether to the closure element in which the tether is fastened separately to each of the cut portions.
Figure 28:
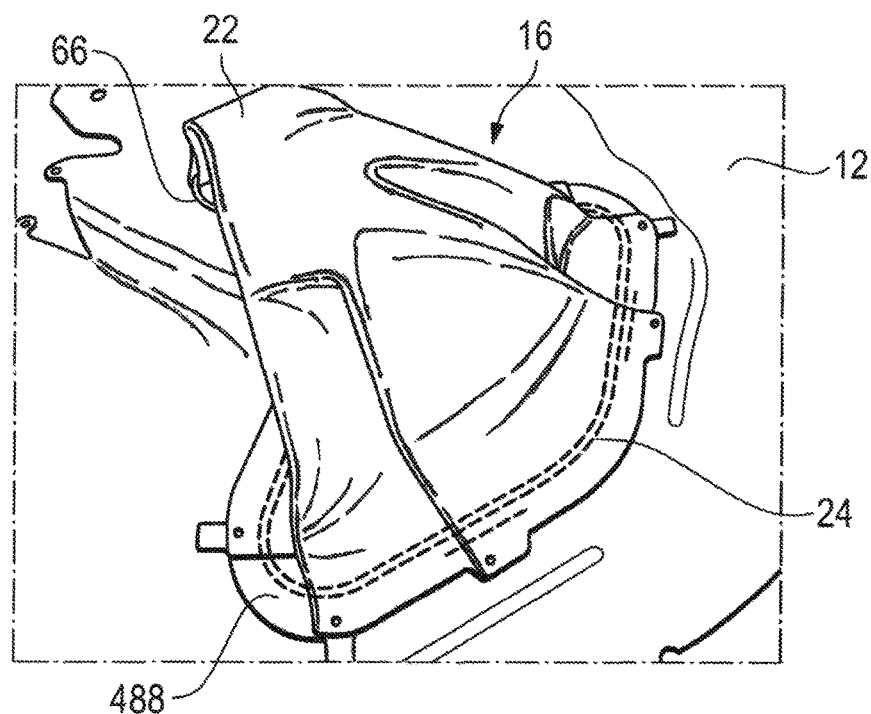
FIG. 28 shows a schematic top view onto an airbag according to the invention having a closure element in accordance with another embodiment.
Figure 29:
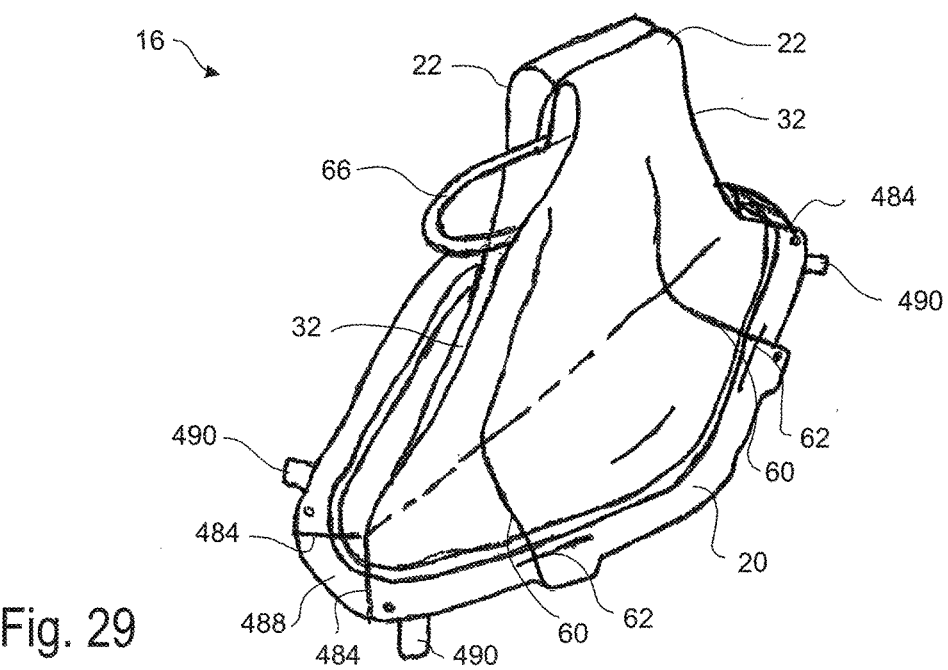
FIG. 29 is a schematic perspective representation of the closure element of FIG. 28.
Figure 30:
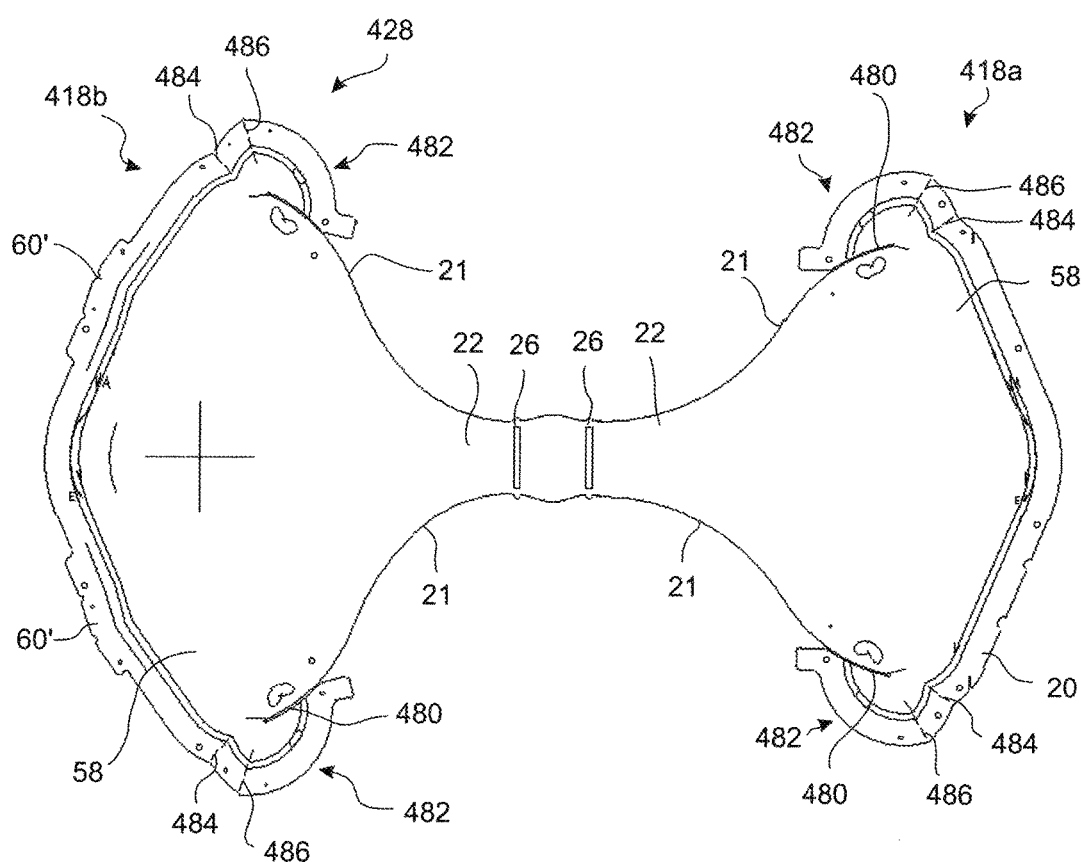
FIG. 30 is a schematic representation of a flatly spread cut of the closure element of FIG. 29.
Figure 31:
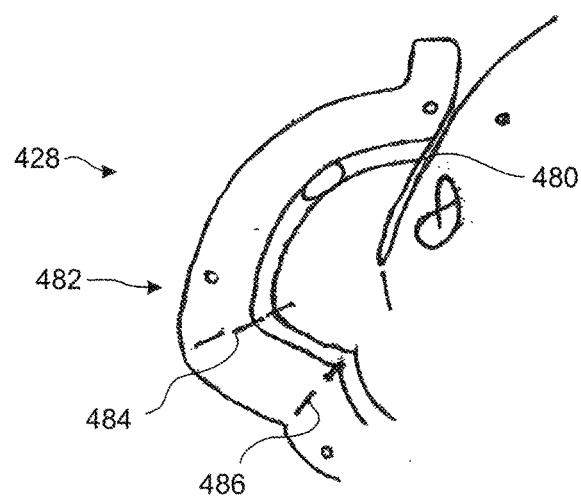
FIG. 31 shows an enlarged detail of FIG. 30.

FIGS. 25 to 27 illustrate the fixation of a tether to the closure element 16. The two cut portions 18a, 18b may be fabricated in any way, also as described concerning the cut portions 118b, 218b and 318b.

In FIG. 25 a loop 66 having a connected fabric portion 68 is fixed to the elongate ends 22 of the two superimposed cut portions 18a, 18b in that the fabric portion 68 is sewn up simultaneously on both cut portions 18a, 18b by a specific seam geometry 70 (see FIG. 26).

Afterwards the tether 34 is pulled through the loop 66, when the closure element 16 is inserted in the airbag shell 12.

FIG. 27, on the other hand, illustrates a variant in which a ribbon 72 (which may also be a string, a cord or anything else, of course) including two fabric portions 68 tightly fixed thereto is provided each of which is sewn up at the elongate ends 22 of a respective cut portion 18a, 18b. When the two cut portions 18a, 18b are fixed to each other, the ribbon 72 automatically forms a loop through which later the tether 34 is pulled.

FIGS. 28 to 42 illustrate another embodiment of a closure element 16 which has a design similar to the one shown in FIGS. 17 through 21. In contrast to the embodiment shown there, the peripheral edge 20 has a different configuration in the area of the narrow ends, however.

In the four outermost edge portions 428 of the two cut portions 418a, 418b excess material is provided. By means of a notch 480 extending in continuation of the sides 21 a fabric lug 482 is formed which remains connected along the peripheral edge 20 to the residual cut of the closure element 416. This is clearly visible in FIGS. 30 and 31.

Figure 32:
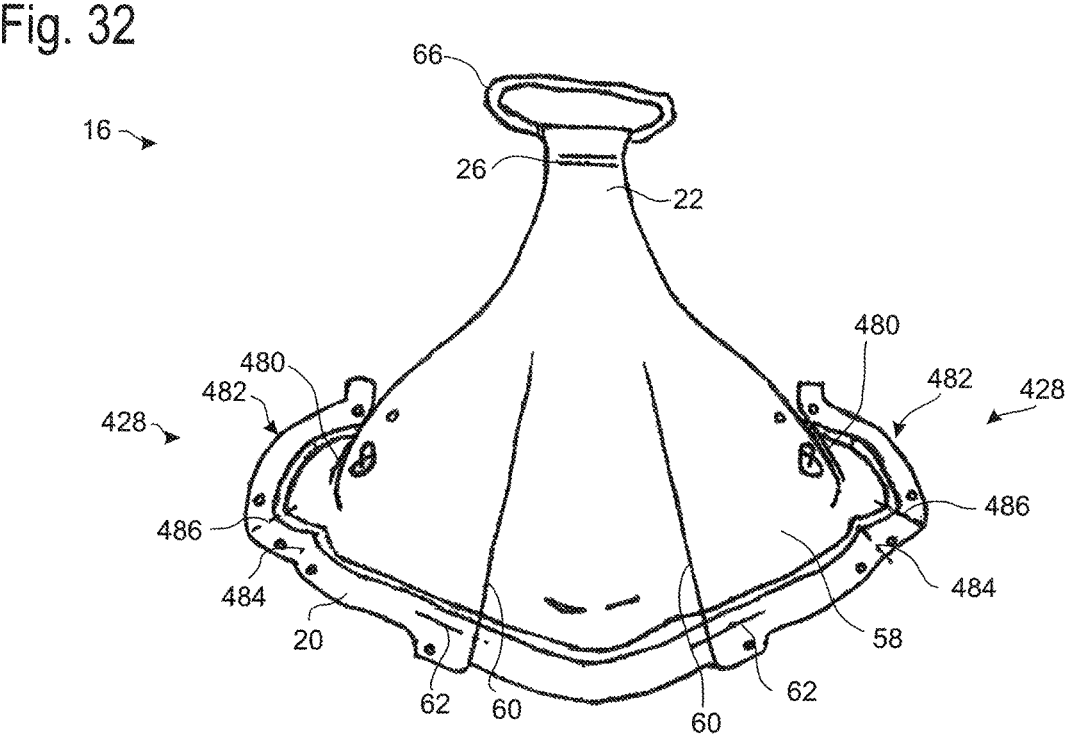
FIG. 32 shows a first folding step when fastening the closure element to the shell of the airbag.

When preparing the cut of the closure element 16 for fixation on the airbag 10, first the cut portions 418a, 418b are superimposed as afore described (after having laid the two folds 60 and secured them by the edge seam 62 in the portion 418b). This is shown in FIG. 32.

Figure 33:
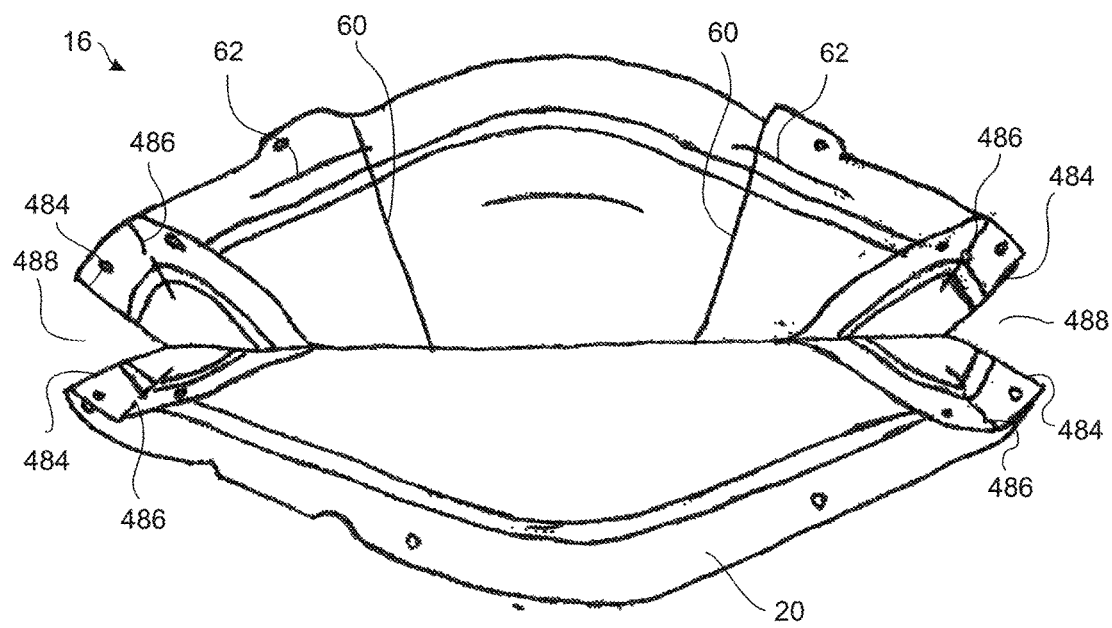
FIG. 33 shows a second folding step.
Figure 34:
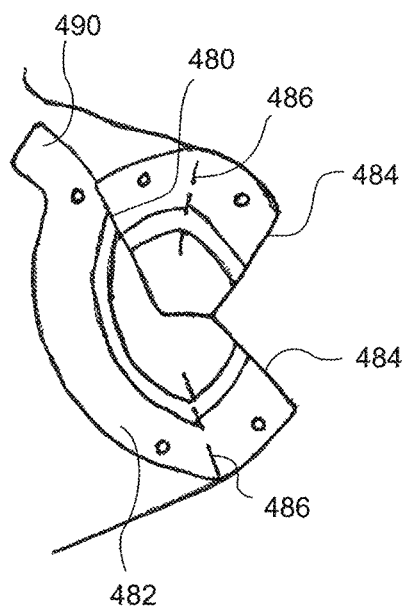
FIGS. 34 to 36 show details of further folding steps.
Figure 35:
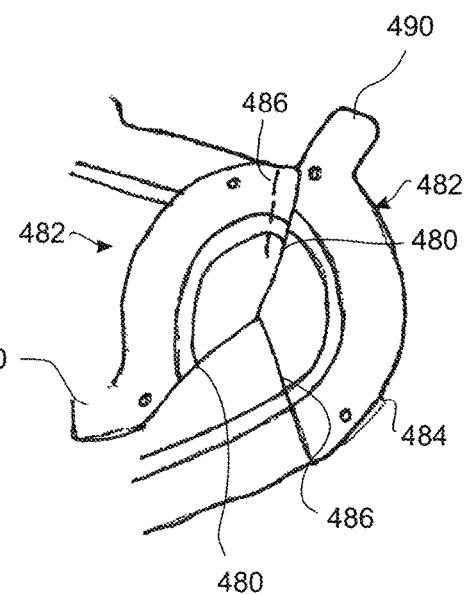

Then the two fabric lugs 482 are folded onto the inner side of the closure element 416, the two lower areas 58 of the portions 418a, 418b being folded along a first folding edge 484. The FIGS. 33 and 37 show a top view from the lower side onto the closure element 16 in this folding state.

In the next step, the two fabric lugs 482 are folded along a second folding edge 486 so that sort of a zigzag folding is formed. The two folding edges 484, 486 extend radially on the peripheral edge 20, as is evident from FIGS. 30 to 34.

Figure 36:
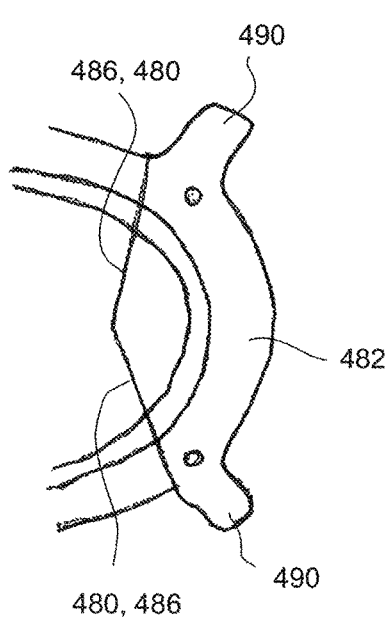
Figure 39:
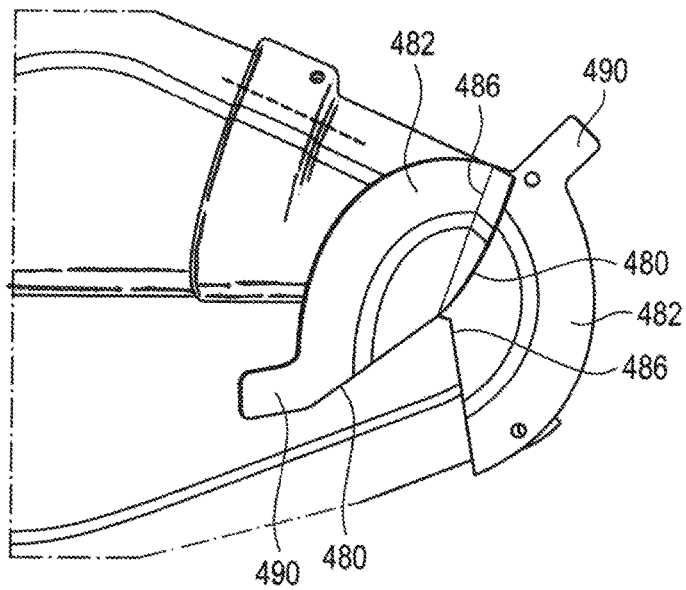
Figure 40:
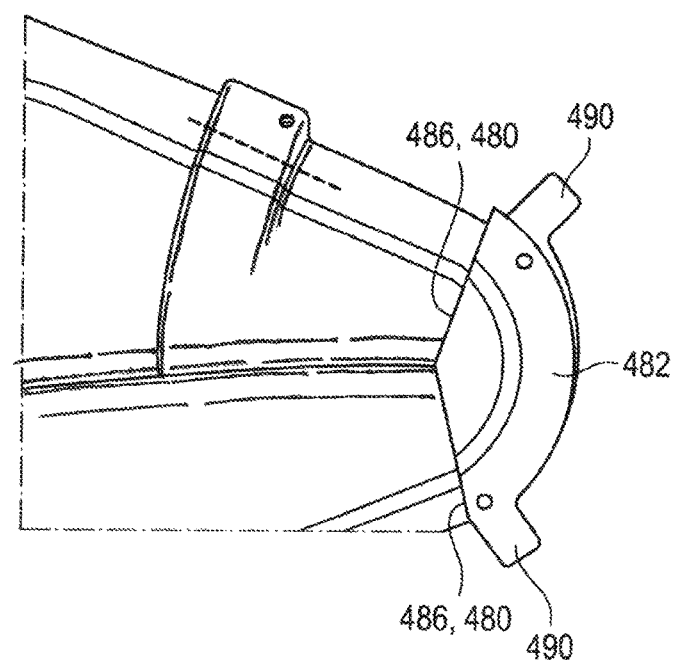
Figure 41:
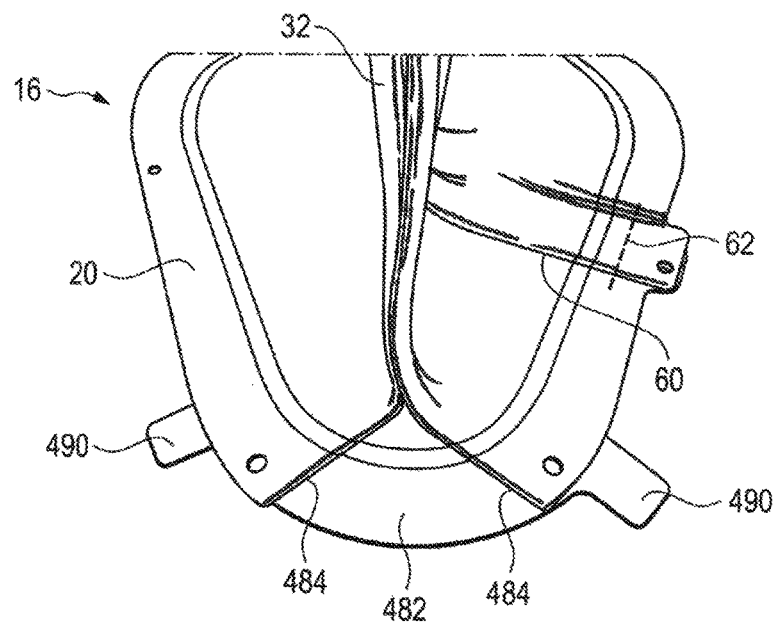
FIG. 41 shows the closure element directly before fastening to the airbag shell.
Figure 42:
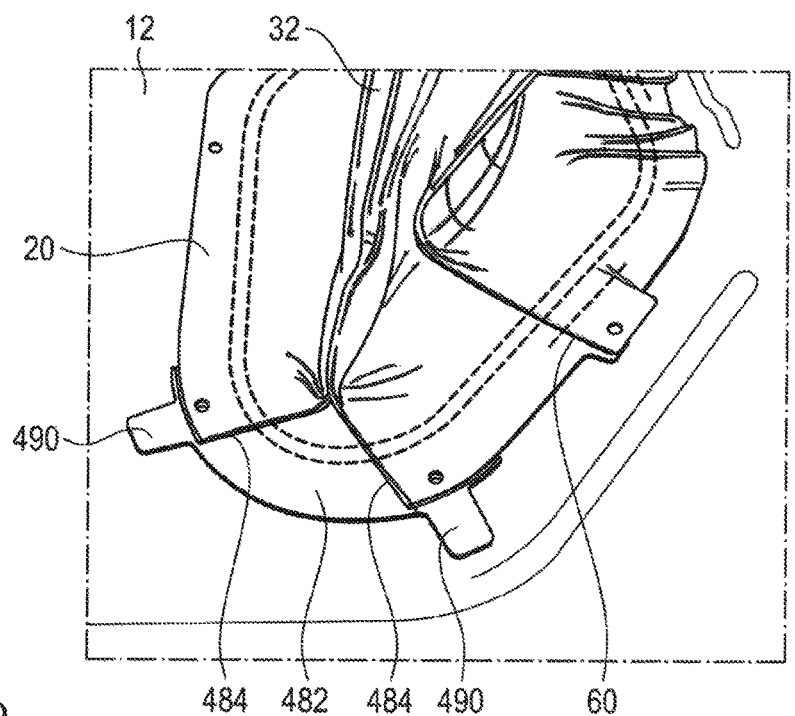
FIG. 42 shows the closure element fastened on the airbag shell.

In a final folding step the two fabric lugs 482 are put on top of each other as shown in FIGS. 36 and 40. One of the edges of the notch 480 of the one fabric lug 482 then is adjacent to the second folding edge 486 of the second fabric lug 482. The edge of the second fabric lug 482 extending along the notch 480 is located in parallel to the second folding edge 486 of the respective other fabric lug 482.

In this way, a tension-free course of the peripheral edge 20 of the closure element 16 is resulting, wherein the overlying fabric lugs 482 are covering the gaps 488 formed by folding the fabric lugs 482 at the narrow sides of the closure element 16.

Moreover, plural sensor tabs 490 allowing automated recognition of the position and positioning of the thus folded prefabricated closure element 16 on the shell 12 of the airbag 10 are arranged along the peripheral edge 20. In this way the peripheral seam 24 may be manufactured by automation by means of a CNC sewing operation.

The folding and the overlying fabric lugs 482 ensure such high stability that a separate connection of the portions 418*a*, 418*b* of the closure element 416 along the peripheral edge 20 before fixation on the airbag 10 can be dispensed with. As a matter of course, it is also possible, for reasons of easy processing, to fix the fabric lugs 482 to each other and/or to the peripheral edge 20 of the cut portions 418*a*, 418*b*.

The invention claimed is:

1. An airbag comprising at least one aperture (14) provided in an airbag shell (12) to which aperture a closure element (16) is attached,
    wherein a tether (34) via which the closure element (16) can be maintained in a closed position acts on the closure element (16),
    wherein the tether (34) is fixed to a pyrotechnical release device (36) which is coupled to a control unit (40) causing loosening of the tether (34) as a function of parameters relating to the occupant and/or the vehicle, thus causing the closure element (16) to arrive at an opened position,
    wherein the closure element (16) includes at least two overlying cut portions (18*a*-418*a*, 18*b*-418*b*) interconnected along a peripheral edge (20),
    and wherein at least one of the cut portions (18*b*-418*b*) includes one or more stitched-down folds (60) or quillings and/or is composed of plural cut parts (164*b*-364*b*) having at least one curved seam (162-362) so that the cut portion (18*b*-418*b*) cannot be flatly spread.

2. The airbag according to claim 1, wherein the closure element (16) in the opened position takes a tapered hollow shape.

3. The airbag according to claim 1, wherein the closure element (16) includes at least one discharge orifice (32).

4. The airbag according to claim 1, wherein during an initial deployment phase of the airbag (10) the closure element (16) is located in its closed position inside of the airbag shell (12).

5. The airbag according to claim 1, wherein on the tether (34) a locking structure (42) is provided which prevents a return movement of the closure element (16) from a predetermined deployment state of the airbag (10).

6. The airbag according to claim 1, comprising at least one aperture (14) provided in an airbag shell (12) to which a closure element (16) having at least one discharge orifice (32) is attached, wherein a peripheral edge (20) of the closure element (16) is fastened circumferentially about the edge of the aperture (14) so that the edge of the aperture (14) forms a peripherally circumferential diaphragm (54) projecting inwardly radially from the peripheral edge (20) of the closure element (16).

7. The airbag according to claim 6, wherein the cross-sectional area of the aperture (14) is approximately diamond-shaped.

8. The airbag according to claim 1, wherein the cut portions (418*a*, 418*b*) are fixed to each other by a fixation of the peripheral edge (20) on the shell (12) of the airbag (10).

9. The airbag according to claim 8, wherein each of the cut portions (18*a*-418*a*, 18*b*-418*b*) includes a subarea (58) which extends from the peripheral edge (20) into the surface of the cut portion (18*a*-418*a*, 18*b*-418*b*) and in the closed position of the closure element (16) the two subareas (58) complement each other to form a surface which corresponds as to its shape to the cross-sectional area of the aperture (14) within the airbag shell (12).

10. The airbag according to claim 8, wherein the closure element (16) consists of two overlying cut portions (18*a*-418*a*, 18*b*-418*b*) each being approximately club-shaped or bell-shaped, wherein at one elongate end (22) of each of the cut portions (18*a*-418*a*, 18*b*-418*b*) a tether (34) is attached and at the peripheral edge (20) opposed to the elongate end (22) the cut portion (18*a*-418*a*, 18*b*-418*b*) is fastened to the airbag shell (12), wherein the cut portions (18*a*-418*a*, 18*b*-418*b*) are sewn up with each other on the elongate end (22) as well as on each edge area (28) in the area of the peripheral edge (20), wherein the cut portions (18*a*-418*a*, 18*b*-418*b*) are not connected along a major part of the side edges (21) located between the elongate end (22) and the peripheral edge (20) so that two lateral discharge orifices (32) are formed in the closure element (16).

11. The airbag according to claim 10, wherein the two cut portions (18*a*, 18*b*; 118*a*, 118*b*; 418*a*, 418*b*) are integrally interconnected at their elongate ends (22).

12. The airbag according to claim 1, wherein a loop (66, 72) which the tether (34) acts on is provided for fastening the tether (34) to the closure element (16).

13. The airbag according to claim 1, wherein the closure element (16) includes two cut portions (418*a*, 418*b*) each comprising a peripheral edge portion, wherein on each free end of the peripheral edge portions a fabric lug (482) is formed which is partly separated from the respective cut portion (418*a*, 418*b*) by a notch (480).

14. The airbag according to claim 13, wherein the fabric lug (482) is folded along two juxtaposed radial folding lines (484, 486) vis-à-vis the surface of the respective cut portion (418*a*, 418*b*) so that a peripheral edge (20) being circumferential in a plane is formed.

15. The airbag according to claim 1, wherein sensor tabs (490) radially projecting from the peripheral edge (20) and enabling automated positional detection are provided at the peripheral edge (20) of the closure element (16).

16. A method of operating a vehicle occupant protection system comprising an airbag (10) according to claim 1, wherein the control unit (40) coupled to the release device (36) causes loosening of the tether (34) already at the beginning of the deployment operation, when a sensor system coupled to the control unit (40) recognizes predetermined parameters relating to the occupant and/or to the vehicle.

17. A method of operating a vehicle occupant protection system comprising an airbag (10) according to claim 1, wherein in an initial deployment state of the airbag (10) the closure element (16) is provided in its opened position,
    wherein upon increasing deployment of the airbag (10) the closure element (16) is pulled into the interior of the airbag shell (12) into the closed position and from a predetermined deployment state sufficient tension is exerted on the closure element (16) via fixation of the tether (34) so as to maintain the closure element (16) in the closed position and
wherein the release device (36) may loosen the tether (34) depending on predetermined parameters relating to the occupant and/or to the vehicle so that the closure element (16) is moved into its opened position again by the internal pressure of the airbag (10).

* * * * *